(12) United States Patent
Migler

(10) Patent No.: US 7,334,994 B2
(45) Date of Patent: Feb. 26, 2008

(54) AUTOMATIC SELF-FEATHERING AND RESETTING SAIL RESTRAINT FOR MIGLER'S VERTICAL AXIS WIND TURBINE

(76) Inventor: Bernard Migler, 1405 Autumn La., Cherry Hill, NJ (US) 08003

( * ) Notice: Subject to any disclaimer, the term of this patent is extended or adjusted under 35 U.S.C. 154(b) by 0 days.

(21) Appl. No.: 11/409,318

(22) Filed: Apr. 24, 2006

(65) Prior Publication Data

US 2007/0248450 A1   Oct. 25, 2007

(51) Int. Cl.
*F03D 11/00* (2006.01)
(52) U.S. Cl. ..................................................... 416/153
(58) Field of Classification Search ................ 416/153, 416/155
See application file for complete search history.

(56) References Cited

U.S. PATENT DOCUMENTS

| 498,068 | A | * | 5/1893 | Lonning | 416/50 |
| 1,524,712 | A | * | 2/1925 | Hurd | 416/140 |
| 2,247,929 | A | * | 7/1941 | Terhune | 416/46 |
| 4,346,305 | A | * | 8/1982 | White | 290/55 |
| 6,926,491 | B2 | * | 8/2005 | Migler | 415/4.4 |

* cited by examiner

*Primary Examiner*—Edward K. Look
*Assistant Examiner*—Nathan Wiehe

(57) ABSTRACT

An improved sail restraint for Migler's vertical axis wind turbine in which excessive wind speed automatically causes the sails to be feathered, protecting them from wind damage, and, when the wind speed is reduced to an allowable level, the improved sail restraint automatically allows the sails to be reset to their nonfeathered, working position.

8 Claims, 14 Drawing Sheets

AUTOMATIC SELF-FEATHERING AND RESETTING SAIL RESTRAINT FOR MIGLER'S VERTICAL AXIS WIND TURBINE

CROSS REFERENCE TO RELATED APPLICATIONS

There are no cross references to related applications for provisional or nonprovisional applications.

STATEMENT REGARDING FEDERALLY SPONSORED RESEARCH OR DEVELOPMENT

There are no rights to this invention made under federally sponsored research or development.

FIELD OF THE INVENTION

The device relates generally to the field of windmills or wind turbines for the production of electricity. More specifically it relates to the field of vertical axis wind turbines.

BACKGROUND OF THE INVENTION

Migler's vertical axis wind turbine U.S. Pat. No. 6,926, 491 B2, hereby incorporated by reference, discloses a vertical axis wind turbine, in which, when the wind speed becomes excessive it becomes necessary to feather all the sails to prevent damage to the sails. This is accomplished by rotating the sail restraints from the vertical to the horizontal position, so that the sails are free to go into the feathered position. The rotation can be accomplished either by manual means, that is by pulling cables that control the position of the sail restraints, or automatically by operation of motorized sail restraint controllers. The latter method requires the monitoring of the wind speed by an anemometer, control circuitry to take the data from the anemometer and then, if the wind speed is excessive, signal the motorized sail restraint controllers to rotate the sail restraints. Both methods are less than satisfactory. The manual means (pulling the cables) requires human attendance and intervention, while the operation of the motorized sail restraint controllers requires the addition of sensors for wind speed, control circuitry and motors, which add cost and complexity to the device. A third problem is that the resetting of the sail restraints by the motorized sail restraint controllers when the wind speed is reduced to allowable levels could result in some of the sails being trapped in the feathered position, that is, on the "wrong" side of the sail restraints. For the device to become practical these three problems must be solved.

The invention described here solves the three problems described above. First, it eliminates the need for human intervention by the pulling of the cables when the wind speed becomes excessive. Second, it eliminates the necessity for the motorized sail restraint controllers, and its associated wind sensor, control circuitry and motors. Third, it automatically resets the sails into the correct nonfeathered working position when the wind speed eventually returns to allowable levels.

BRIEF SUMMARY OF THE INVENTION

The invention consists of a modified sail restraint that has an arm projecting from the horizontal arm of the wind turbine, and two spring-restrained vertical members at the end of the arm. One of these vertical members is called the "main" vertical member and the second vertical member is called a "flapper." The expansion spring restraining the main vertical member (the "mainspring") requires that a strong force be exerted on it in order to expand. The spring restraining the flapper (the "flapper-spring") requires that a weak force be exerted on it in order to expand.

When the wind speed is not excessive, the frame of a sail pushes with force against the main vertical member but does not cause the mainspring to expand or to expand only partially. The wind then causes the wind turbine to rotate, producing electricity.

When the wind speed is excessive, the frame of the sail pushes against the main vertical member and causes the mainspring to expand so that the vertical member is pushed backwards sufficiently allowing the frame of the sail to move past the sail restraint and into the safety of the feathered position of the wind turbine.

With the sails in the safety of the feathered position, the wind speed eventually calms down and returns to a safe operating speed. When the wind eventually pushes the sail frame against the flapper, there is little resistance from the flapper-spring and the frame of the sail easily moves past the flapper. Once the sail frame is past the flapper it is in the nonfeathered position and ready to resume normal operation.

BRIEF DESCRIPTION OF THE DRAWINGS

The invention is not intended to be limited to the precise arrangements and instrumentalities shown.

FIG. 3 is a cross-sectional side view of the modified sail restraint showing the frame of a sail being pushed by wind against the flapper, causing the mainspring to expand.

Frame 5 is a cross-sectional side view showing the sail now in the feathered position. The mainspring has contracted, returning the sail restraint to its normal position.

Figure 6:
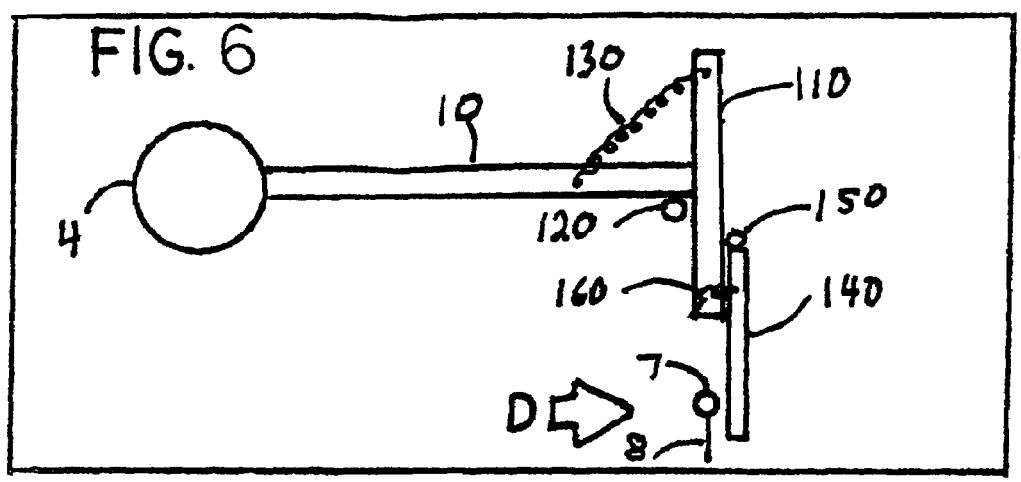
Figure 7:
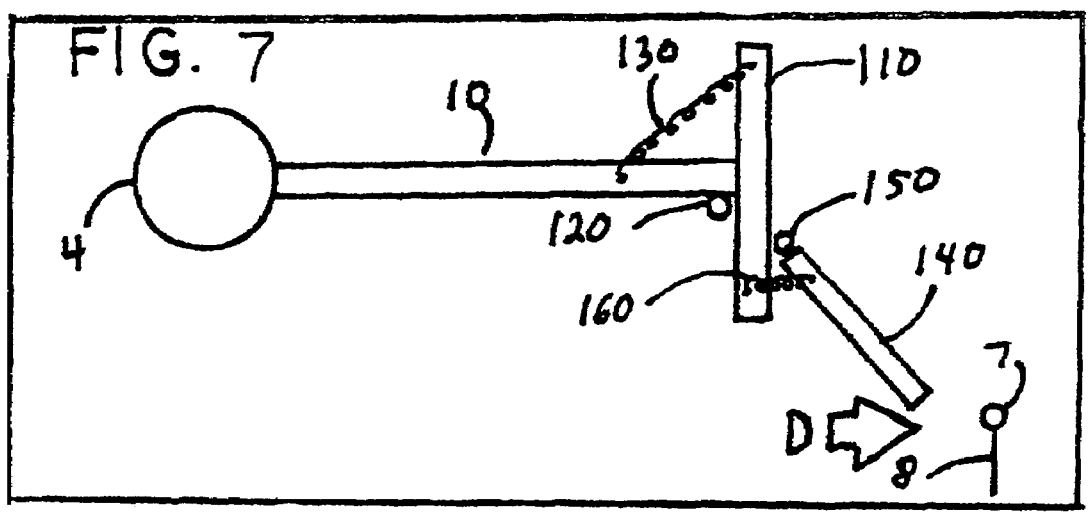
Figure 8:
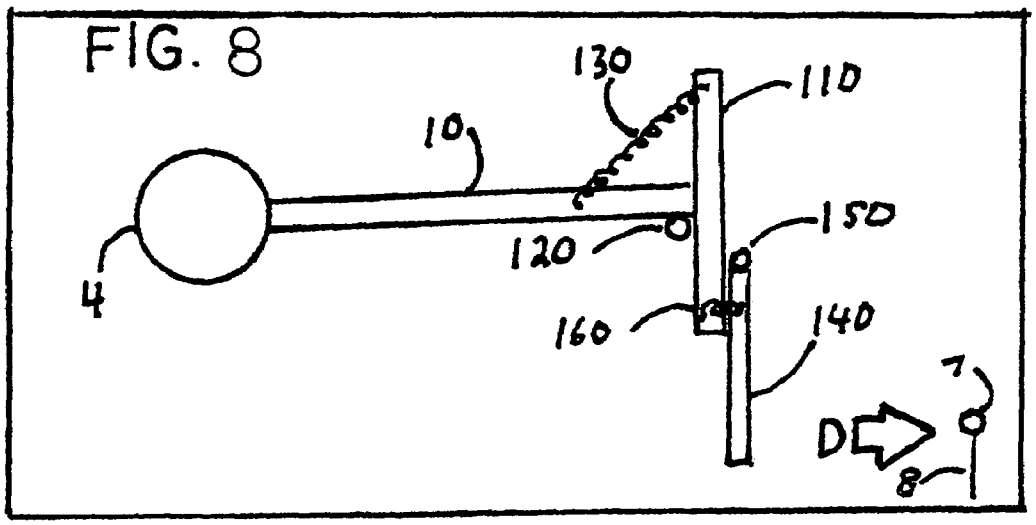

FIG. 6 is the first of a sequence of three figures, FIG. 6, FIG. 7 and FIG. 8. The sequence shows the resetting of the device to its normal configuration when the wind speed reduces to allowable levels and eventually pushes the sail toward the flapper. FIG. 6 is a cross-sectional side view showing the frame of the sail being pushed against the flapper.

FIG. 7 is a cross-sectional side view showing the flapper-spring being expanded sufficiently so that the frame of the sail can pass by the sail restraint. This is accomplished easily because the flapper-spring requires only a weak force to be expanded. In another embodiment the flapper spring is eliminated (not shown.)

FIG. 8 is a cross-sectional side view showing the flapper-spring in its contracted position, with the flapper returned to its normal position, and with the frame of the sail now in the normal, nonfeathered position. The device has been reset and is now ready to resume normal operation.

Figure 9:
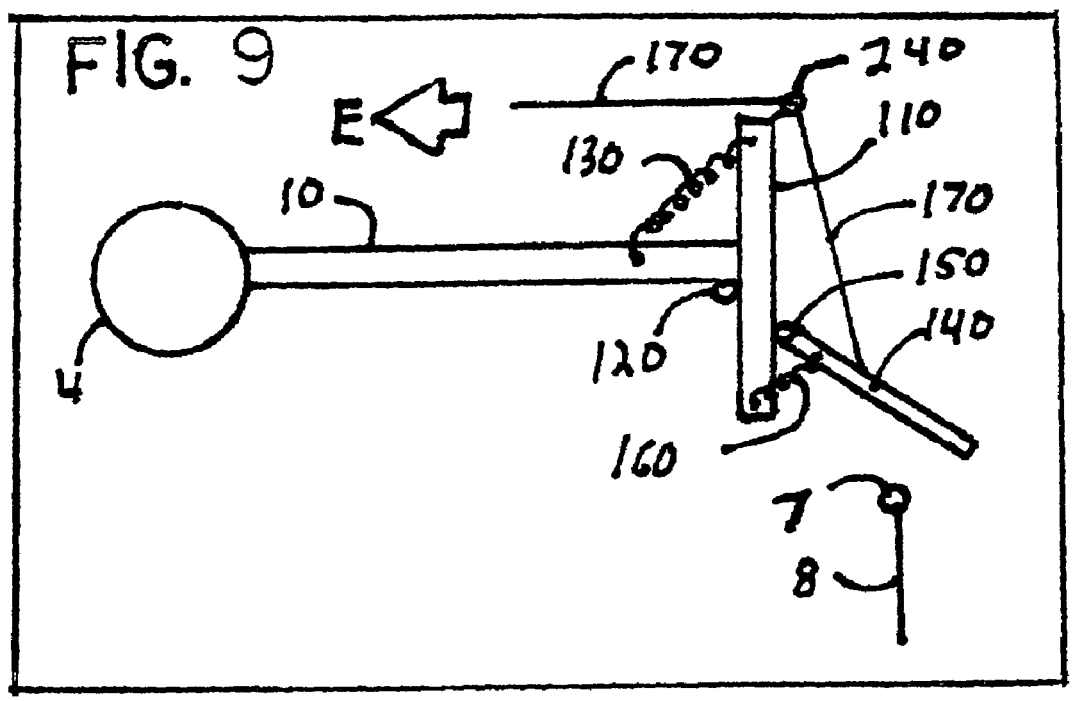

FIG. 9 is a cross-sectional side view of the modified sail restraint. FIG. 9 shows a cable secured to the flapper through a pulley. The cable has been pulled so as to raise the flapper. When the flapper is raised sufficiently, the frame of a sail is allowed to enter the feathered position, halting the rotation of the device. The flapper will need to be raised in this way to conduct maintenance operations when the wind speed is at allowable levels. The cable may be pulled manually or by motorized means (not shown.)

Figure 10:
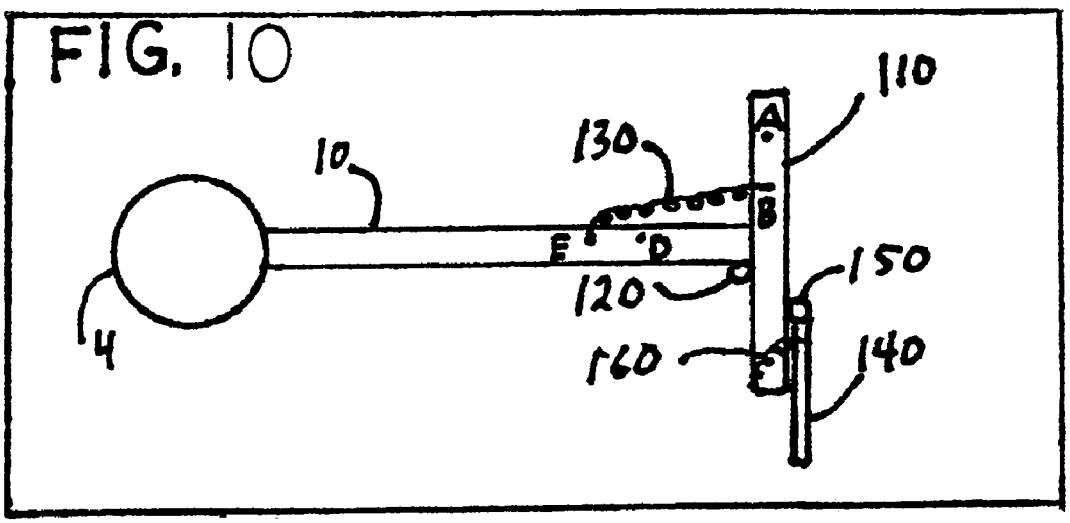

FIG. 10 is a cross-sectional side view of the modified sail restraint showing means to adjust the resistance of the mainspring by adjusting its attachment points. The mainspring is shown attached to point B on the vertical member, down from its original position at point A. In addition, the mainspring is shown attached to point E on the arm, displaced from its original position at point D. With the mainspring now attached to points B and E, the mainspring is more easily expanded by the pressure of a sail frame against the sail restraint. With this arrangement a wind speed of lesser velocity will cause the sails to become feathered.

Figure 11:
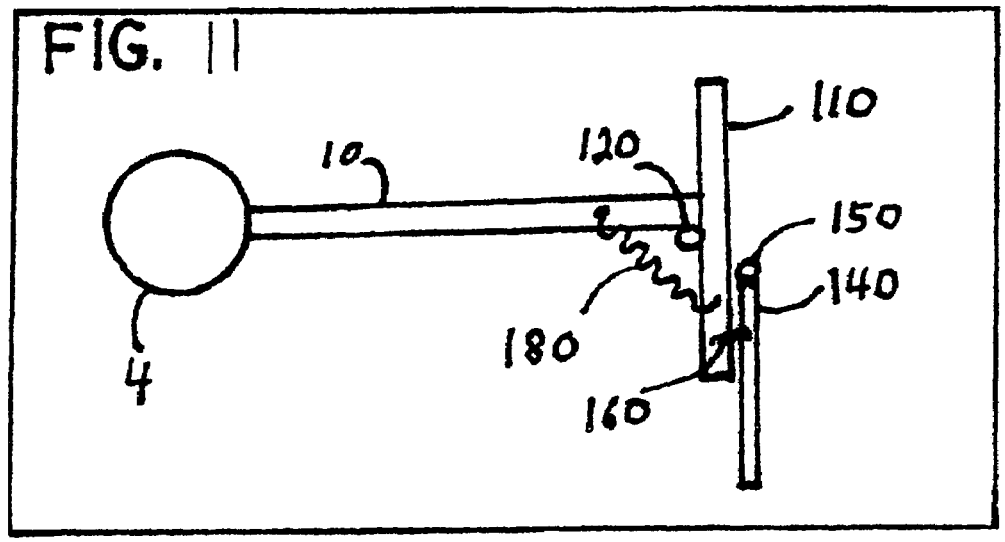

FIG. 11 is a cross-sectional side view of the device showing the elimination of the mainspring and its replacement with a compression spring restraining the main vertical member. The compression spring is secured to the main vertical member below the rotatable joint and to the horizontal arm.

Figure 12:
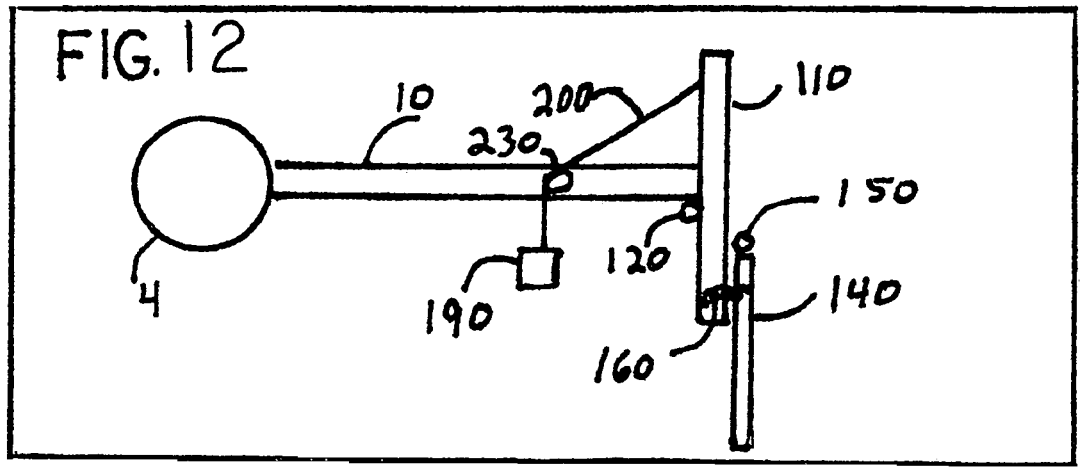

FIG. 12 is a cross-sectional side view of the device showing the elimination of the mainspring and its replacement with a weight suspended from a cable secured to the main vertical member through a pulley.

Figure 13:
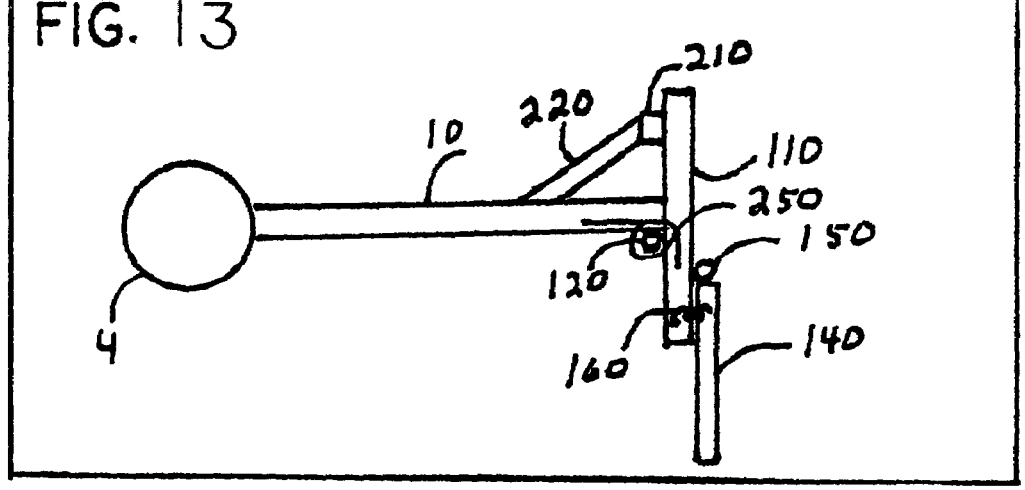

FIG. 13 is a cross-sectional side view of the modified sail restraint showing the replacement of the mainspring with a magnet and its supporting arm. FIG. 13 also shows a torsion spring restraining the main vertical member. The torsion spring is secured to the main vertical member below the rotatable joint and to the horizontal arm.

Figure 14:
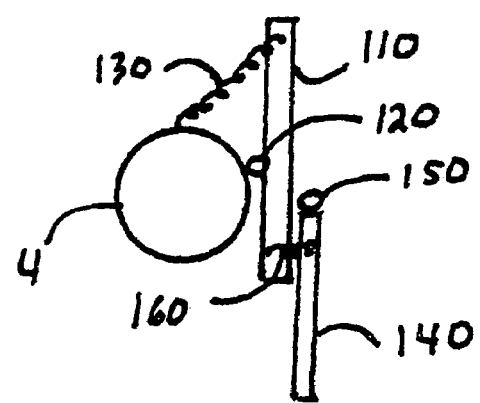

FIG. 14 is a cross-sectional side view of the modified sail restraint showing the elimination of the arm of the sail restraint, and the attachment of the rotatable joint of the vertical member directly to the horizontal arm of the wind turbine. FIG. 14 also shows the attachment of the mainspring at one end to the horizontal arm of the wind turbine and at the other end to the main vertical member.

DETAILED DESCRIPTION OF THE DRAWINGS

Figure 1:
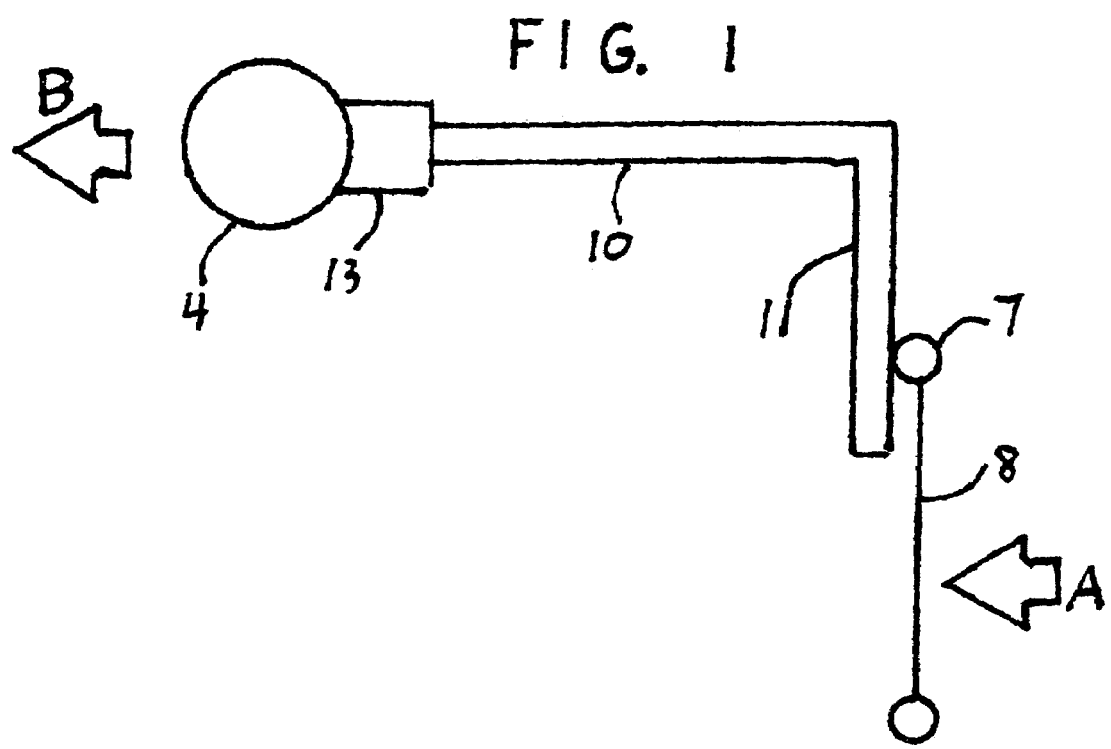
FIG. 1 is a cross-sectional side view of the original sail restraint as disclosed in FIG. 1 of Migler's vertical axis wind turbine. The motorized sail restraint controller is shown secured to the horizontal arm of the wind turbine. The sail restraint is shown secured to the motorized sail restraint controller. (The sail restraint is shown in the inverted position. This is the position it would be in when the sails are mounted below the horizontal arm of the wind turbine, as disclosed by Migler.)

Referring now to the drawing in FIG. 1, there is shown a cross-sectional side view of the original sail restraint as disclosed in Migler's vertical axis wind turbine. The reader is referred to that Patent for a complete description of the operation of the wind turbine and its sail restraints. A motorized sail restraint controller 13 is shown secured to a horizontal arm 4 of said vertical axis wind turbine. A sail restraint 10 is shown secured to said motorized sail restraint controller 13. The cross-section side view shown here in FIG. 1 is from the point of contact of the frame of the sail 7, through the sail restraint 10, through the motorized sail restraint controller 13 to the horizontal arm 4. FIG. 7 in Migler's patent discloses sails and their sail restraints mounted above as well as below the horizontal arms of the device. Sails and their sail restraints mounted below the horizontal arms of the device are the preferred embodiment of the device. Accordingly, FIG. 1 shows the modified sail restraint in the preferred inverted position.

Figure 2:
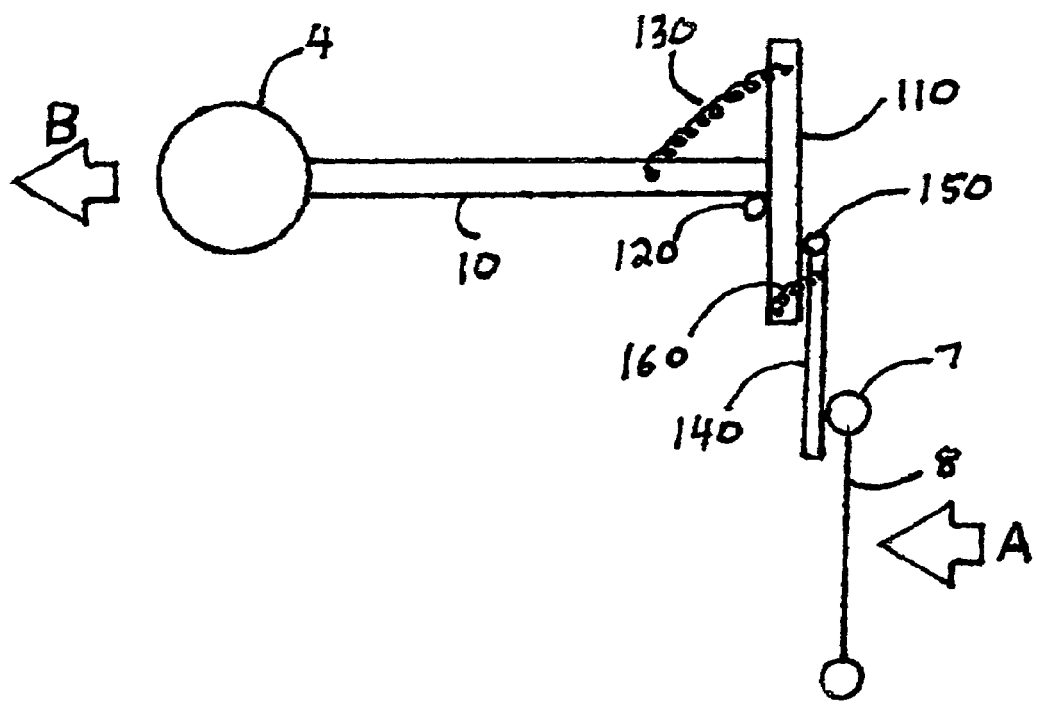
FIG. 2 is a cross-sectional side view of the modified sail restraint as disclosed here. The figure shows the elimination of the motorized sail restraint controller; an arm secured to the horizontal arm of the wind turbine; a main vertical member secured to a rotatable joint on the arm; a mainspring restraining the main vertical member; a flapper secured to a rotatable joint on the main vertical member; and a flapper-spring restraining the flapper.

Referring now to the drawing in FIG. 2 in detail, there is shown a cross-sectional side view a modified sail restraint. The sail restraint shown is a replacement for the sail restraint used in Migler's vertical axis wind turbine. The motorized sail restraint controller 13 shown in FIG. 1 is eliminated and the horizontal arm of the sail restraint (hereafter referred to as the "arm") 10 is secured directly to the horizontal arm 4 of the wind turbine. At the end of the arm 10, a main vertical member 110, is shown secured to a main rotatable joint 120. A main expansion spring (hereafter referred to as a "mainspring") 130, is secured at one end to said arm 10, and at the other end to said main vertical member 110. A vertical member (hereafter referred to as a "flapper") 140 is secured to said main vertical member 110, by a rotatable flapper joint 150. A flapper extension spring (hereafter referred to as a "flapper-spring") 160 lightly holds the flapper 130 against the main vertical member 110. A sail 8 and its frame 7 are shown positioned against said flapper 130.

The direction of the wind in FIG. 2 is shown by arrowhead A at the lower right corner of the figure. The wind is shown driving the sail 8, and the sail's frame 7, against the flapper 140. In FIG. 2 the speed of the wind is not excessive, so that the pressure of the sail frame 7 against the flapper 140 does not cause the mainspring 130 to expand, and therefore the horizontal arm 4 of the wind turbine is pushed in the direction indicated by arrowhead B in the upper left corner of the figure.

Figure 3:
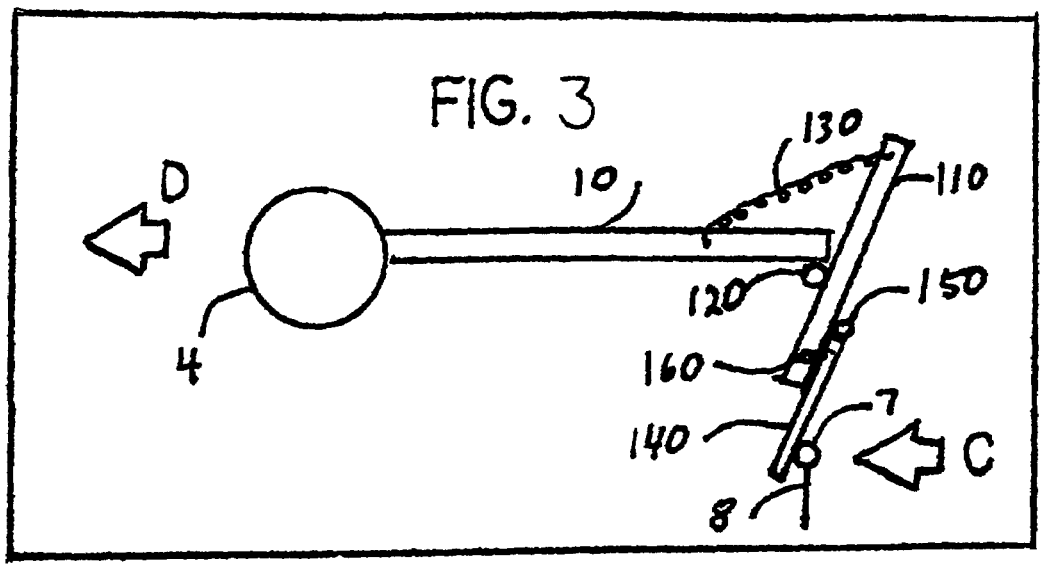
FIG. 3 is the first of a sequence of three figures, FIG. 3, FIG. 4 and FIG. 5. The sequence shows the operation of the modified sail restraint during excessive wind speed.
Figure 4:
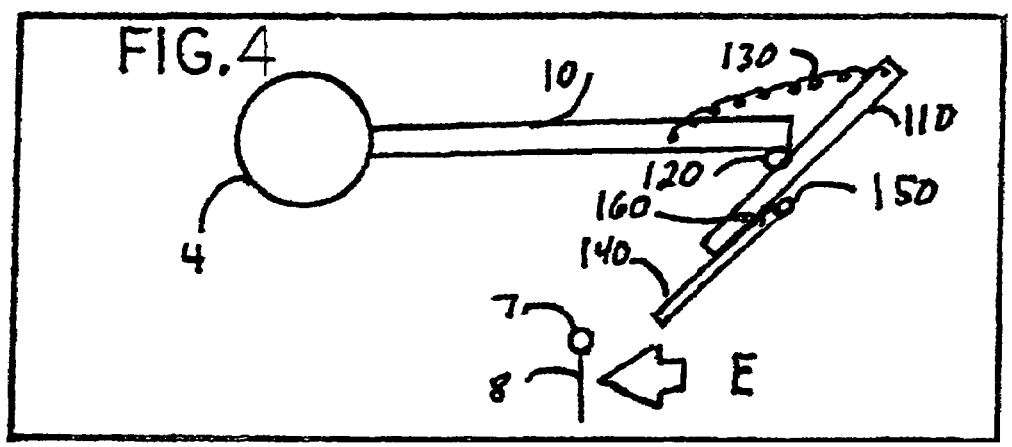
FIG. 4 is a cross-sectional side view showing the mainspring being expanded sufficiently by excessive wind speed so that the frame of the sail can pass by the flapper. The mainspring requires a strong force to make it expand, thereby allowing the sail to pass by only when the wind speed is excessive, as in this case. When the frame of the sail passes by the flapper the sail is in the feathered, that is, the protected position.
Figure 5:
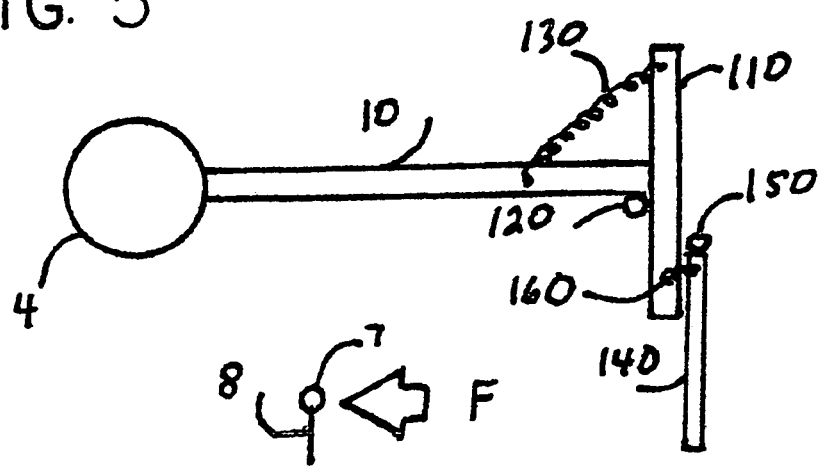

Referring now to the sequence of drawings in FIGS. 3, 4 and 5 there is shown a cross-sectional side view of the modified sail restraint shown in FIG. 2 to illustrate how the sail 8 and sail frame 7 become feathered as a result of high wind speed. Referring now to the drawing in FIG. 3 there is shown a cross-sectional side view of the modified sail restraint shown in FIG. 2. In FIG. 3 the wind is shown coming from the direction indicated by the arrowhead in the lower right corner of the figure and should be understood as blowing at a speed that is strong but not excessive and does not require that the sail be feathered to avoid damage. The upper section of the frame 7 of the sail 8, is shown pushing against the flapper 140 causing the mainspring 130 to expand partially.

Wind speed of this intensity will cause the horizontal arm 4 of the wind turbine to rotate in the direction shown by the arrowhead on the left side of the figure.

FIG. 4 shows the result of excessive wind speed. The mainspring 130 is fully extended, and the main vertical member 110 and the flapper 140 have been pushed back sufficiently, as indicated by the arrowhead in the figure, so that the frame of the sail 7 and the sail 8 have passed by and into the safety of a feathered position.

FIG. 5 shows the result immediately after the sail frame 7 and sail 8 have passed the flapper 140. As indicated by the arrowhead the sail 8 and frame 7 are now feathered. FIG. 5 also shows that the mainspring 130 and flapper-spring 160 have contracted, returning the main vertical member 110, and the flapper 140 to their normal upright position.

Referring now to the sequence of drawings in FIGS. 6, 7 and 8, there is shown a cross-sectional side view of the modified sail restraint shown in FIG. 2 to illustrate how the sail 8 and sail frame 7 are reset to their normal operating position after feathering due to high wind speed. In FIG. 6 the wind should be understood as blowing at a speed that is less than excessive, that it is coming from the direction shown by the arrowhead in the figure, and that the sail 8 and its frame 7 are about to be pushed against the flapper 140 by the wind.

FIG. 7 shows that the flapper-spring 160, which requires little force to expand, has been expanded, the flapper 140 has been pushed out of the way by the sail frame 7 and sail 8, and the sail and sail frame have passed by the flapper.

FIG. 8 shows the sail 8 and sail fame 7 reset to the normal operating position, and the flapper 140 restored to its normal position with its flapper-spring 160 contracted. In another embodiment the flapper spring 160 is eliminated (not shown) and the flapper 140 returns to its normal position by the force of gravity.

Referring now to the drawing in FIG. 9 there is shown a cross-sectional side view of the modified sail restraint shown in FIG. 2. On occasion it will be necessary to halt the rotation of the wind turbine so as to perform maintenance. FIG. 9 shows an embodiment of the device that halts the rotation of the wind turbine. In FIG. 9 a cable 170, is shown attached to the flapper 140 through a pulley 240. The cable 170 has been pulled in the direction of the arrowhead in the figure, resulting in the lifting of the flapper 140. With the flapper 140 lifted sufficiently, as shown, the sail frame 7 and sail 8 become feathered and can no longer push the device. Accordingly, the rotation of the wind turbine is halted.

Referring now to the drawing in FIG. 10 there is shown a modification of the sail restraint shown in FIG. 2. It may be necessary to adjust the sensitivity of the device so that feathering occurs at different wind speeds. For example it may be desired that feathering occur at a wind speed of 30 miles per hour rather than 50 miles per hour.

FIG. 10 shows means to accomplish this by adjusting the force required to expand the mainspring 130. The attachment point of the mainspring 130 on the main vertical member 110 can be changed from position A to any other position on the main vertical member 110, for example to position B. Lowering the attachment point to point B gives the main vertical member 110 greater leverage to expand the mainspring 130. The attachment point of the mainspring 130 on the arm 10 may also be adjusted, for example, from point D to point E. As a result of these adjustments a lower wind speed will cause feathering.

Referring now to the drawing in FIG. 11 there is there is shown a modification of the sail restraint shown in FIG. 2. The mainspring 130 is eliminated in this embodiment. In FIG. 11 there is shown a compression spring 180 secured at one end to the main vertical member 110 below the main rotatable joint 120, and at the other end to the arm 10 of the sail restraint. The compression spring 180 resists the motion of the main vertical member 110. (The attachment point of the compression spring 180 to the main vertical member 110 and the arm 10 may be adjusted to adjust its resistance, as can be done with the mainspring 130 (not shown.)

Referring now to the drawing in FIG. 12 there is there is shown a modification of the sail restraint shown in FIG. 2. The mainspring 130 is eliminated in this embodiment. A weight 190 is secured to the main vertical member 110 by a cable 200 and pulley 230. The weight 190 serves to restrain the movement of the main vertical member 110 in the same way as the mainspring 130. The weight may be adjusted (not shown) as needed, to adjust the force needed to allow feathering. The device functions in the same way as it does with the mainspring 130.

Referring now to the drawing in FIG. 13 there is shown a modification of the sail restraint shown in FIG. 2. In FIG. 13 the mainspring 130 is eliminated, and is replaced by a magnet 210, which is held in position against the main vertical member 110 by a magnet support arm 220. The magnet 210 resists the motion of the main vertical member 110. The strength of the magnet may be adjusted (not shown) as needed. The strength of the magnet 210 determines the wind speed that will produce feathering.

FIG. 13 also shows a torsion spring 250 restraining the main vertical member. 110. The torsion spring 250 is secured to the main vertical member 110 below the rotatable joint 120 and to the horizontal arm 10.

Referring now to the drawing in FIG. 14 there is shown a cross-sectional side view of the modified sail restraint shown in FIG. 2. In this embodiment, the arm 10 of the sail restraint is eliminated. The main rotatable joint 120 is secured to the horizontal arm 4 of the wind turbine, and the mainspring 130 is secured at one end to the horizontal arm 4 of the wind turbine and at the other end to the main vertical member 110.

I claim:

1. A sail restraint for a vertical axis wind turbine comprising:
    (a) an arm extending from a horizontal arm of a vertical axis wind turbine;
    (b) a rotatable joint secured at the end of said arm;
    (c) a main vertical member secured to said rotatable joint;
    (d) a mainspring secured at one end to said arm and at the other end to said main vertical member;
    (e) a rotatable flapper joint secured to said main vertical member;
    (f) a flapper secured to said rotatable flapper joint;
    (g) a flapperspring secured at one end to said flapper and at the other end to said main vertical member;
    whereby wind speed that is not excessively high pushes a sail frame of a vertical axis wind turbine against said flapper, said mainspring does not expand sufficiently to allow said sail frame to pass by said flapper, causing the wind turbine to rotate; and
    whereby when excessively high wind speed pushes a sail frame of a vertical axis wind turbine against said flapper, said mainspring expands sufficiently to allow said sail frame to pass by said flapper, placing said sail frame and its sail into the safety of a feathered position on the wind turbine, and
    whereby, with the sail frame and sail in the feathered position, when the wind speed eventually falls below excessive levels, and the wind eventually pushes said sail frame against said flapper, said flapper-spring expands sufficiently to allow said sail frame to pass by said flapper, and into the normal operating position of the wind turbine.

2. The sail restraint as claimed in claim 1 in which a cable is secured to said flapper;
    whereby when said cable is pulled, said flapper is lifted sufficiently so that the sail frame and sail of a vertical axis wind turbine may pass by said flapper into the feathered position, halting rotation of the wind turbine and allowing maintenance operations.

3. The sail restraint as claimed in claim 1 in which the attachment points of said mainspring is secured at any position on said main vertical member and arm, whereby the resistance of said mainspring to expansion is adjusted; and whereby the wind speed that causes feathering is adjusted.

4. A sail restraint for a vertical axis wind turbine comprising:
- (a) an arm extending from a horizontal arm of a vertical axis wind turbine;
- (b) a rotatable joint secured at the end of said arm;
- (c) a main vertical member secured to said rotatable joint;
- (d) a compression spring, secured at one end to said arm, and at the other end to said main vertical member below said rotatable joint;
- (e) a rotatable flapper joint secured to said main vertical member;
- (f) a flapper secured to said rotatable flapper joint;
- (g) a flapperspring secured at one end to said flapper and at the other end to said main vertical member;

whereby wind speed that is not excessively high pushes a sail frame of a vertical axis wind turbine against said flapper, said compression spring does not compress sufficiently to allow said sail frame to pass by said flapper, causing the wind turbine to rotate; and whereby when excessively high wind speed pushes a sail frame of a vertical axis wind turbine against said flapper, said compressionspring compresses sufficiently to allow said sail frame to pass by said flapper, placing said sail frame and its sail into the safety of a feathered position on the wind turbine, and whereby, with the sail frame and sail in the feathered position, when the wind speed eventually falls below excessive levels, and the wind eventually pushes said sail frame against said flapper, said flapper-spring expands sufficiently to allow said sail frame to pass by said flapper, and into the normal operating position of the wind turbine.

5. A sail restraint for a vertical axis wind turbine comprising:
- (a) an arm extending from a horizontal arm of a vertical axis wind turbine;
- (b) a rotatable joint secured at the end of said arm;
- (c) a main vertical member secured to said rotatable joint;
- (d) a cable secured at one end to said main vertical member and at the other end to an adjustable weight;
- (e) a rotatable flapper joint secured to said main vertical member;
- (f) a flapper secured to said rotatable flapper joint;
- (g) a flapperspring secured at one end to said flapper and at the other end to said main vertical member;

whereby wind speed that is not excessively high pushes a sail frame of a vertical axis wind turbine against said flapper, said adjustable weight is not lifted sufficiently to allow said sail frame to pass by said flapper, causing the wind turbine to rotate; and whereby when excessively high wind speed pushes a sail frame of a vertical axis wind turbine against said flapper, said adjustable weight is lifted sufficiently to allow said sail frame to pass by said flapper, placing said sail frame and its sail into the safety of a feathered position on the wind turbine, and whereby, with the sail frame and sail in the feathered position, when the wind speed eventually falls below excessive levels, and the wind eventually pushes said sail frame against said flapper, said flapper-spring expands sufficiently to allow said sail frame to pass by said flapper, and into the normal operating position of the wind turbine.

6. A sail restraint for a vertical axis wind turbine comprising:
- (a) an arm extending from a horizontal arm of a vertical axis wind turbine;
- (b) a rotatable joint secured at the end of said arm;
- (c) a main vertical member secured to said rotatable joint;
- (d) an adjustable magnet;
- (e) a rotatable flapper joint secured to said main vertical member;
- (f) a flapper secured to said rotatable flapper joint;
- (g) a flapperspring secured at one end to said flapper and at the other end to said main vertical member;

whereby wind speed that is not excessively high pushes a sail frame of a vertical axis wind turbine against said flapper, said adjustable magnet is not sufficiently overcome to allow said sail frame to pass by said flapper, causing the wind turbine to rotate; and whereby when excessively high wind speed pushes a sail frame of a vertical axis wind turbine against said flapper, said adjustable magnet is withdrawn sufficiently to allow said sail frame to pass by said flapper, placing said sail frame and its sail into the safety of a feathered position on the wind turbine, and whereby, with the sail frame and sail in the feathered position, when the wind speed eventually falls below excessive levels, and the wind eventually pushes said sail frame against said flapper, said flapper-spring expands sufficiently to allow said sail frame to pass by said flapper, and into the normal operating position of the wind turbine.

7. A sail restraint for a vertical axis wind turbine comprising:
- (a) an arm extending from a horizontal arm of a vertical axis wind turbine;
- (b) a rotatable joint secured at the end of said arm;
- (c) a main vertical member secured to said rotatable joint;
- (d) ) a torsion spring secured at one end to said arm and at the other end to said main vertical member;
- (e) ) a rotatable flapper joint secured to said main vertical member;
- (f)) a flapper secured to said rotatable flapper joint;
- (g) a flapperspring secured at one end to said flapper and at the other end to said main vertical member whereby wind speed that is not excessively high pushes a sail frame of a vertical axis wind turbine against said flapper, said torsion spring does not rotate sufficiently to allow said sail frame to pass by said flapper, causing the wind turbine to rotate; and whereby when excessively high wind speed pushes a sail frame of a vertical axis wind turbine against said flapper, said torsion spring rotates sufficiently to allow said sail frame to pass by said flapper, placing said sail frame and its sail into the safety of a feathered position on the wind turbine, and whereby, with the sail frame and sail in the feathered position, when the wind speed eventually falls below excessive levels, and the wind eventually pushes said sail frame against said flapper, said flapper-spring expands sufficiently to allow said sail frame to pass by said flapper, and into the normal operating position of the wind turbine.

8. A sail restraint for a vertical axis wind turbine comprising:
- (a) a rotatable joint secured to a horizontal arm of a vertical axis wind turbine;
- (b) a main vertical member secured to said rotatable joint;

(c) a mainspring secured at one end to said arm and at the other end to said main vertical member;
(d) a rotatable flapper joint secured to said main vertical member;
(e) a flapper secured to said rotatable flapper joint;
(f) a flapperspring secured at one end to said flapper and at the other end to said main vertical member;
whereby wind speed that is not excessively high pushes a sail frame of a vertical axis wind turbine against said flapper, said mainspring does not expand sufficiently to allow said sail frame to pass by said flapper, causing the wind turbine to rotate; and
whereby when excessively high wind speed pushes a sail frame of a vertical axis wind turbine against said flapper, said mainspring expands sufficiently to allow said sail frame to pass by said flapper, placing said sail frame and its sail into the safety of a feathered position on the wind turbine, and
whereby, with the sail frame and sail in the feathered position, when the wind speed eventually falls below excessive levels, and the wind eventually pushes said sail frame against said flapper, said flapper-spring expands sufficiently to allow said sail frame to pass by said flapper, and into the normal operating position of the wind turbine.

\* \* \* \* \*